US009324138B2

(12) United States Patent
Olsen (10) Patent No.: US 9,324,138 B2
(45) Date of Patent: Apr. 26, 2016

(54) GLOBAL CONTRAST CORRECTION

(71) Applicant: Eric Olsen, Bountiful, UT (US)

(72) Inventor: Eric Olsen, Bountiful, UT (US)

(*) Notice: Subject to any disclaimer, the term of this patent is extended or adjusted under 35 U.S.C. 154(b) by 52 days.

(21) Appl. No.: 14/212,527

(22) Filed: Mar. 14, 2014

(65) Prior Publication Data

US 2014/0267378 A1 Sep. 18, 2014

Related U.S. Application Data

(60) Provisional application No. 61/791,379, filed on Mar. 15, 2013, provisional application No. 61/893,687, filed on Oct. 21, 2013.

(51) Int. Cl.
*G06T 5/00* (2006.01)
*G06T 5/40* (2006.01)
*G06T 5/50* (2006.01)

(52) U.S. Cl.
CPC . *G06T 5/009* (2013.01); *G06T 5/40* (2013.01); *G06T 5/50* (2013.01); *G06T 2207/10024* (2013.01); *G06T 2207/10032* (2013.01); *G06T 2207/20221* (2013.01); *G06T 2207/30188* (2013.01)

(58) Field of Classification Search
CPC ............ G06T 5/50; G06T 2207/20221; G06T 2207/20021; G06T 5/007; G06T 5/009; G06T 2207/20192; G06T 5/001; G06T 5/40; G06T 5/20; G09G 2320/06; G09G 2320/066; G09G 2320/0693; H04N 17/04
See application file for complete search history.

(56) References Cited

U.S. PATENT DOCUMENTS

| | | | | |
|---|---|---|---|---|
| 2007/0036405 A1* | 2/2007 | Lienard | ..................... | G06T 5/50 382/128 |
| 2007/0229443 A1* | 10/2007 | Sawada | ................ | G09G 3/3611 345/101 |
| 2008/0310752 A1* | 12/2008 | Han | .......................... | G06T 5/20 382/274 |
| 2009/0080753 A1* | 3/2009 | De Villiers | ............... | A61B 6/00 382/132 |
| 2010/0012840 A1* | 1/2010 | King | ...................... | G02B 23/12 250/330 |
| 2010/0296694 A1* | 11/2010 | Little | .................... | G01J 5/0003 382/100 |
| 2011/0013834 A1* | 1/2011 | Hsu | ......................... | G06T 5/009 382/168 |
| 2012/0219214 A1* | 8/2012 | Bao | .......................... | H04N 1/60 382/164 |
| 2012/0274778 A1* | 11/2012 | Knight | ................... | G01N 25/72 348/164 |
| 2014/0148705 A1* | 5/2014 | Linn | ....................... | A61B 5/01 600/474 |

OTHER PUBLICATIONS

Evening; Martin, 2007, Adobe Photoshop CS3 for Photographers, p. 370.*

* cited by examiner

*Primary Examiner* — Todd Buttram
(74) *Attorney, Agent, or Firm* — Stoel Rives LLP (57) ABSTRACT

Systems and methods may apply global contrast correction to a plurality of thermal images. For example, a vehicle may capture a plurality of aerial thermal images for use in generating a composite image. Each individual thermal image may be individually contrasted based on the temperature range of pixels in that image, so the contrast range of the thermal images may vary. The plurality of thermal images may be analyzed to determine a global contrast range. Extreme temperatures may be excluded from the global contrast range. Based on the global contrast range, a contrast level of each of the plurality of thermal images may be adjusted. For example, the individual temperature range of each thermal image may be scaled to a global temperature range. A composite image having consistent contrasting may be generated from the plurality of thermal images.

21 Claims, 7 Drawing Sheets

GLOBAL CONTRAST CORRECTION

RELATED APPLICATION

This application claims the benefit under 35 U.S.C. §119 (e) of U.S. Provisional Patent Application No. 61/791,379, filed Mar. 15, 2013, and titled "Global Contrast Correction for Ortho-Rectified Images" and U.S. Provisional Patent Application No. 61/893,687, filed Oct. 21, 2013, and titled "Systems and Methods for Producing Temperature Accurate Thermal Images," which are hereby incorporated by reference herein in their entirety to the extent the subject matter is not inconsistent herewith.

TECHNICAL FIELD

This disclosure relates to systems and methods for providing global contrast correction. More specifically, this disclosure relates to global contrast correction for thermal images.

DETAILED DESCRIPTION OF PREFERRED EMBODIMENTS

Methods and apparatuses for global contrast correction of images are presented. In the following description, numerous details are set forth. It will be apparent, however, to one of ordinary skill in the art having the benefit of this disclosure, that embodiments of the present invention may be practiced without these specific details.

Figure 1:
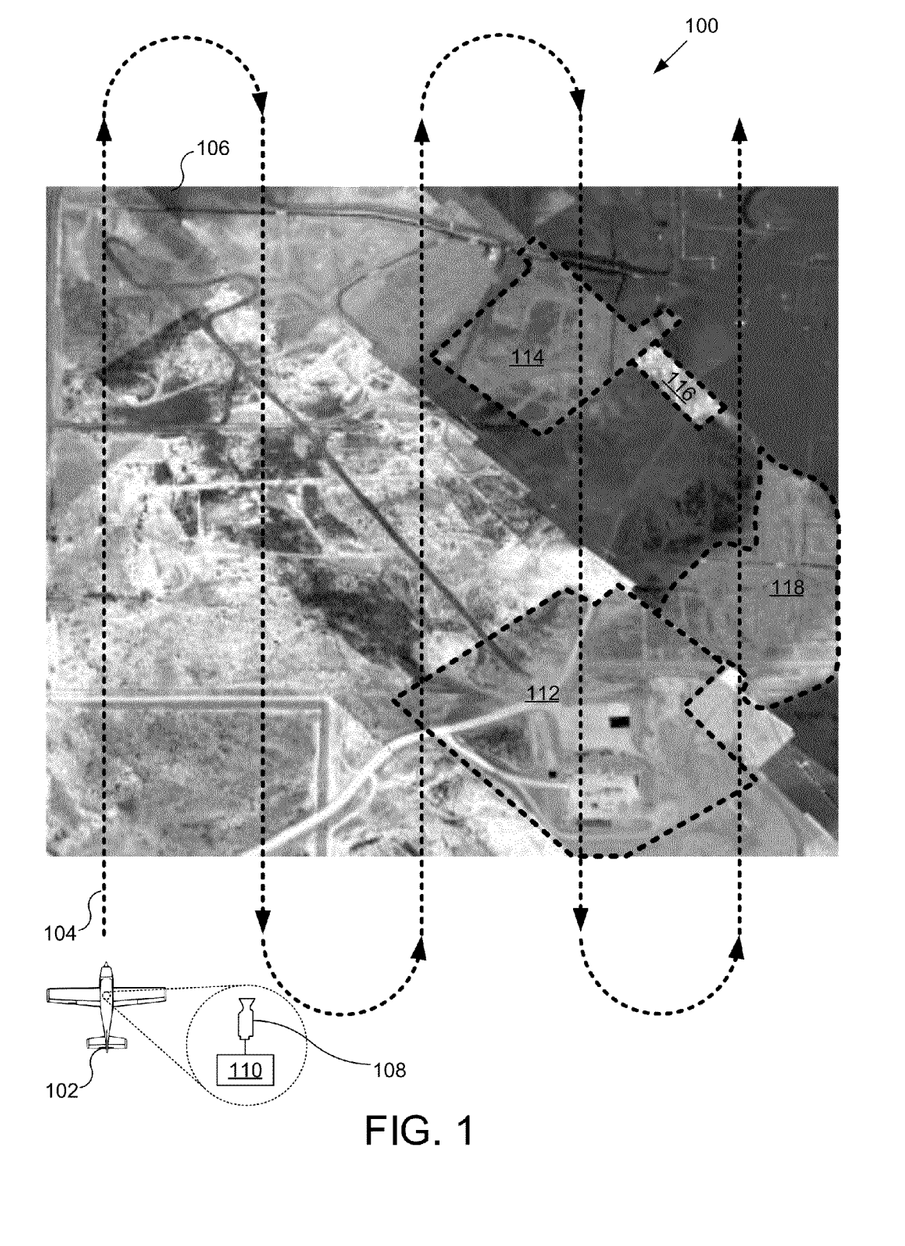
FIG. 1 is a diagram illustrating one embodiment of a system for generating a globally contrasted composite image.

FIG. 1 is a diagram illustrating one embodiment of a system 100 for generating a globally contrasted composite image. In the depicted embodiment, a vehicle 102 follows a path 104 over terrain 106 while capturing images with an image capture device 108 for processing by an image generator 110. The vehicle 102 is capable of traversing over or on the terrain 106 and following a path determined, in part, by the capabilities of the image capture device 108. In the depicted embodiment, the vehicle 102 is an airplane. Other examples of vehicles 102 suitable for use in embodiments of the present disclosure include, but are not limited to, vehicles capable of flight (i.e., helicopters, gliders, drones, powered parachutes or gliders), and vehicles capable of land- or water-based travel.

The path 104, in one embodiment, is pre-determined according to a variety of factors that may include, the width of the area to be covered, and the field of view of the image capture device 110. For example, if the width of the field of view of the image capture device 108 is approximately 1000 feet when the vehicle is at an altitude of 10,000 feet, then to capture the terrain 106 having a width of about 5000 feet, a total of at least five passes across the terrain 106 are required. Images captured by the image capture device 108 may be stored in the image generator 110. Each image captures a portion of the terrain 106, and a large number of images may be required to generate a composite image of the entire terrain 106. However, each image may be captured with a different contrast level, among other variables (i.e., perspective).

The depicted embodiment illustrates an area having inconsistent contrast levels. For example, region 112, 114, 116, 118 each illustrate an area having a contrast level that is not consistent with an adjacent region. A "hotspot" in one of the regions 112, 114, 116, and 118 may skew the contrast levels for the entire region and cause the contrast levels of the region to not be consistent with an adjacent region. The contrast level of a region will be described below with reference to FIG. 4. Although the systems and methods to be described below will be described with reference to a thermal images of the terrain, the principles described herein may be applicable to other types of images.

The image generator 110, beneficially, is configured to receive images from the image capture device 108, store the images together with image metadata information, and process the images to create a composite image with a consistent contrast level. As used herein, the phrase "composite image" refers to an image formed of many smaller images. Stated differently, a composite image may be an image of a city that is formed of smaller images, where each of the smaller images is an image of one city block, for example. The smaller images may be stitched together to form the larger composite image.

The image capture device 108 is, in one embodiment, a thermographic camera. The image capture device (hereinafter "camera") 108 is configured to form an image using infrared radiation to capture temperature information of the terrain. The amount of radiation emitted by an object increases with temperature; therefore, the thermal image allows a person to see variations in temperature. Warm objects stand out against cooler backgrounds. The "brightest" part of the image may be colored white, generally, while the coolest areas of the image may be colored black. Although the following description may describe the image with reference to a black and white color space, it is to be understood that the described principles apply equally to colored thermal images. In a grayscale thermal image, the camera 108 maps temperatures to different shades of grayscale. One example of a thermographic camera suitable for use with embodiments of the present disclosure is the ICI 7640 P-Series Infrared Camera manufactured by Infrared Cameras, Inc. of Beaumont Tex.

Figure 2:
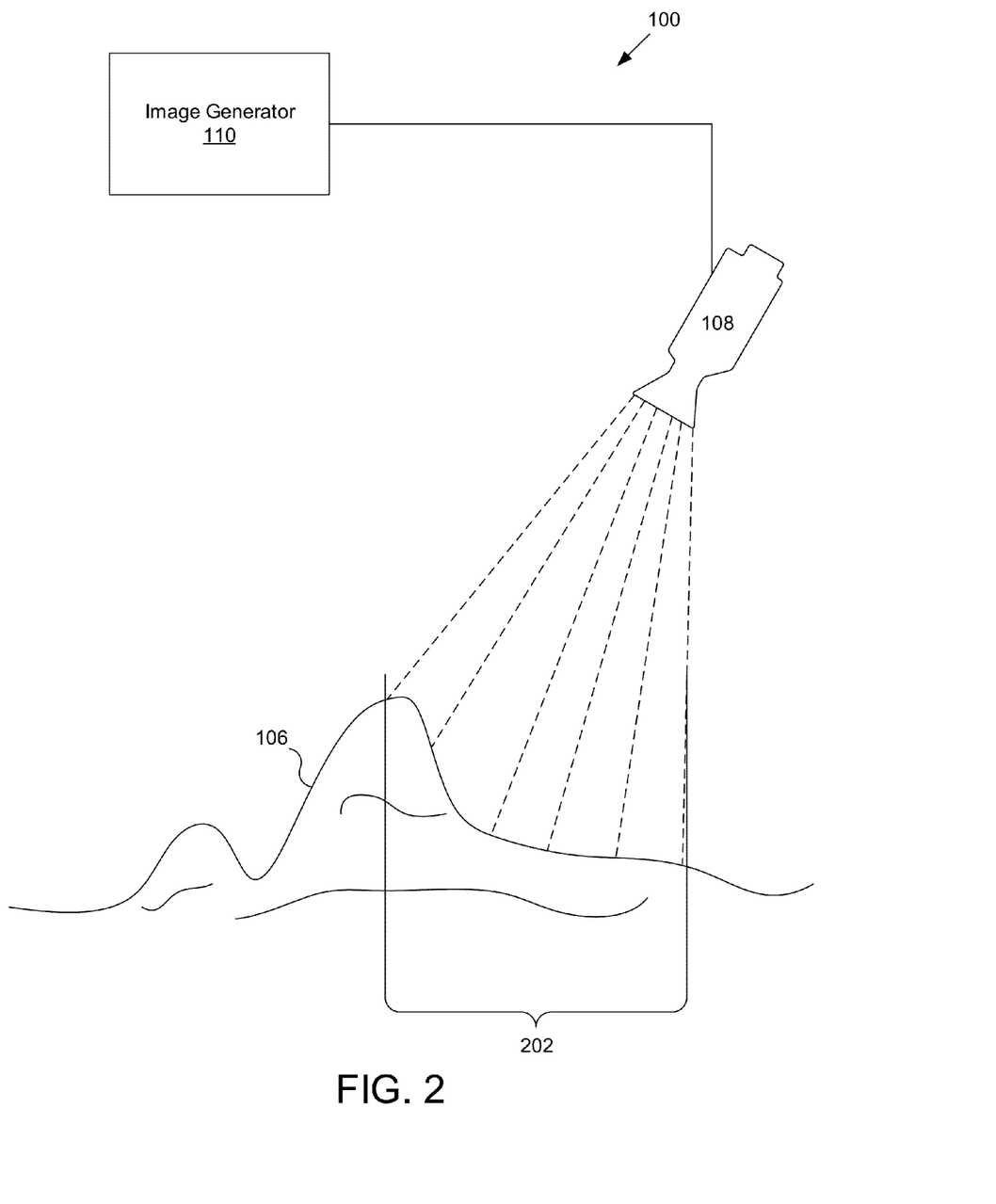
FIG. 2 is a schematic block diagram illustrating one embodiment of the system in accordance with embodiments of the present disclosure.

FIG. 2 is a schematic block diagram illustrating one embodiment of the system 100 in accordance with embodiments of the present disclosure. The system 100 is configured to capture images of the terrain 108, contrast correct, and orthorectify the images, and create a composite image of the entire terrain 106. Images captured by the camera 108 may be taken from different perspectives (angles). Because the terrain 106 is not flat, images captured by the camera 108 may not effectively convey the topography of the terrain.

Orthorectification is the process by which the image generator 110 creates a three-dimensional model of the terrain 106 and matches the images to the three-dimensional model. Points of interest are sampled from the image and are assembled on the three-dimensional model. The image generator then adjusts the images to match the points of interest in the images with the points of interest on the three-dimensional model.

The camera 108, as described above, is capable of capturing a portion 202 of the terrain. Accordingly, to properly capture a large area, the camera 108 captures a series of images to form into a composite image. The area of the terrain 106 that the camera 108 is capable of capturing is referred to as the field of view, as described above. The image generator 110 maintains the series of images together with metadata relating to each image. The image may be captured, by the camera 108, in any one of different image formats including, but not limited to, jpeg, tiff, bmp, raw, dat, etc.

Figure 3:
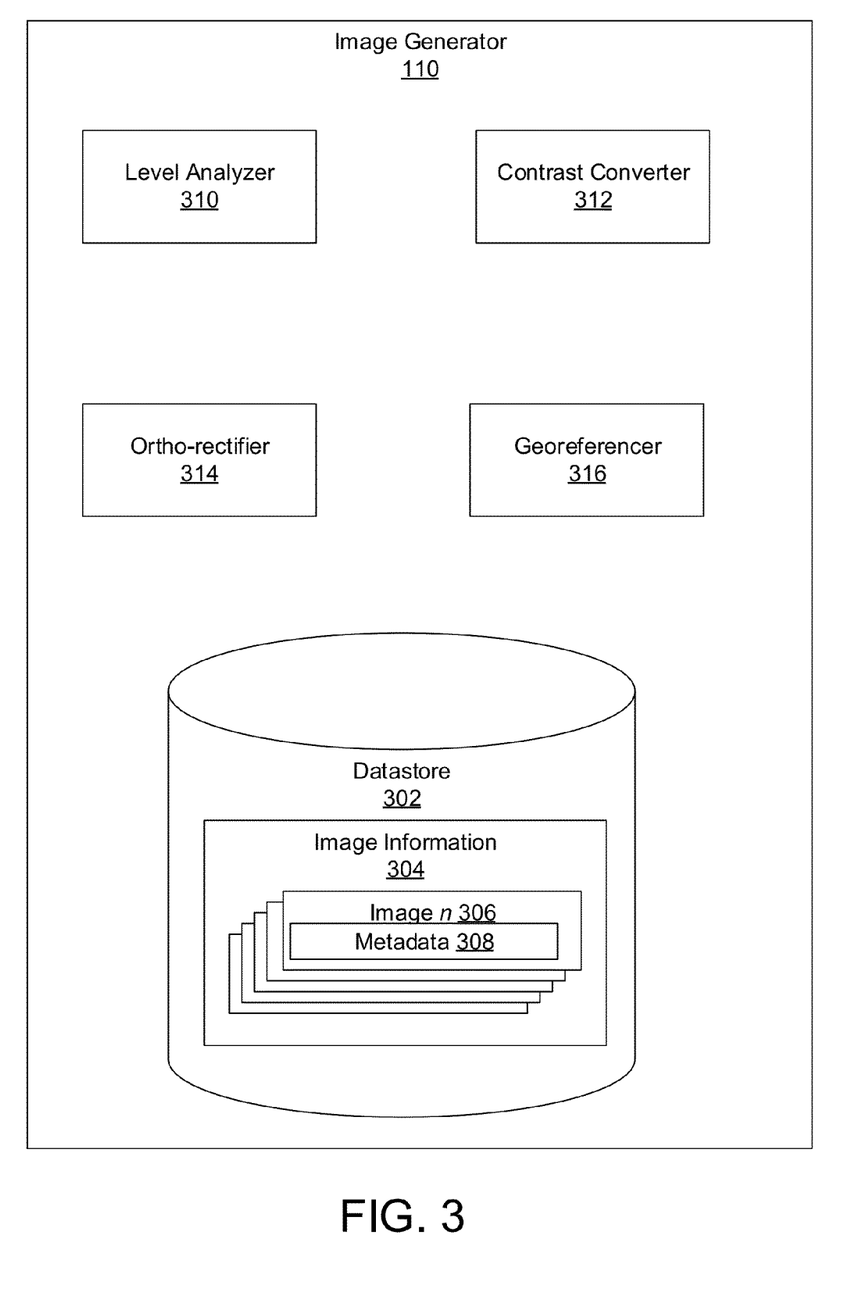
FIG. 3 is a schematic block diagram illustrating one embodiment of the image generator in accordance with embodiments of the present disclosure.

FIG. 3 is a schematic block diagram illustrating one embodiment of the image generator 110 in accordance with embodiments of the present disclosure. As described above, the image generator 110 is configured to store the series of images. The image generator 110, in one embodiment, includes a data store 302 for maintaining image information 304. Although depicted as a database, the data store 302 may also be any type of data repository. The image information 304 may be maintained in the form of any database schema, or in the form of a file that can store data. The database schema may be of the type of a relational database or an object oriented database, an operational data store. Alternatively, the data store 302 may be a schema-less data store, for example, a distributed data store.

The image information 304, in one example, includes a series of images 306. Each image 306 may be stored with metadata 308. The metadata 308, in one embodiment, includes any type of relevant image information including, but not limited to, gps information, speed of the vehicle, ambient temperature, altitude, angle of image capture, etc.

The level analyzer 310, in one embodiment, is configured to analyze the contrast of each of the images 306 to determine a high and a low contrast level. The level analyzer 310 also is configured to determine a tonal distribution of each image. One example of a tonal distribution is a histogram that is graphical representation of the tonal distribution of each image 306. The level analyzer 310, accordingly, may be configured to generate a histogram that calculates how many pixels of each image correspond to a particular tonal value. For example, using a grayscale color space of 256 shades of grayscale, the level analyzer 310 is configured to determine how many pixels in an image correspond to each of the different 256 shades of grayscale. In other words, the level analyzer 310 may produce the histogram by separating the different shades of the image into 256 categories and counting the number of image pixels in each category. The level analyzer 310 is configured to analyze each image and update the metadata 308 of each image with the result of the analysis. In one example, the result of the analysis is a table of the pixel counts. In another embodiment, the result of the analysis is a high and a low value for a brightness of the image.

In another embodiment, the level analyzer generates a cumulative probability distribution function based on the histogram of each image. The cumulative probability distribution function is a function that may be generated to describe the histogram distribution. In other words, the cumulative probability distribution function describes how the pixels of the image are distributed across a number of discrete colors, for example, 256 shades of grayscale.

The contrast converter 312 is configured to access the metadata 308 of each image to adjust the contrast of each image to generate a uniform composite image of the images 306. In one example, the contrast converter 312 is configured to identify a high brightness level of each individual image and a low brightness level of each individual image. The contrast converter 312 then determines a global high contrast level and a global low contrast level. In one embodiment, contrast converter 312 is configured to map the global high contrast level to a high range of predetermined discrete colors, and the global low contrast level to a low range of the predetermined discrete colors. For example, if the range of predetermined discrete colors is a range of grayscale colors, from 0-255, then the global high contrast level is mapped to the high 255, and the global low contrast level is mapped to 0.

In another embodiment, the contrast converter 312 is configured to access the metadata of each image and generate a uniform composite image by analyzing the temperature range of each image. In this example, the contrast converter 312 identifies and maintains a maximum temperature, and a minimum temperature of each of the individual images. The contrast converter 312 is configured to average all of the maximum temperatures from all of the images, and likewise, average the minimum temperature of all of the images. The contrast converter 312 then maps the average maximum temperature to the high end of the color range, and the average minimum temperature is mapped to the low end of the temperature range. For temperatures in-between, the contrast converter 312 scales the number of discrete temperatures to correspond to the number of discrete shades of grayscale, for example shade 0 to shade 255. For example, if the average temperature range of the images is 70 to 102 degrees, the contrast converter 312 is configured to map the average minimum of 70 degrees to shade 0, and the average maximum of 102 degrees to shade 255. The range of 32 degrees is scaled to match the 256 shades of grayscale, or in other words, each degree of temperature is scaled to eight shades of grayscale.

In this embodiment, the contrast converter 312 is configured to receive, from the user, an acceptable range of temperatures. In other words, the user may specify an acceptable range of temperatures to be displayed in the resulting composite image. Accordingly, temperature anomalies may be disregarded, and not included in the average temperature calculation. For example, a device, such as a generator, that causes the thermograph to record a temperature an order of magnitude greater than an adjacent region may be disregarded so as to not skew the average calculation.

In another embodiment, the contrast converter 312 is configured, as described above, to identify the global high temperature and the global low temperature and scale a temperature range of each individual image to match the global high temperature and the global low temperature. For example, If the global high temperature is 110 degrees, and the global low temperature is 55 degrees, the contrast converter 312 is configured to skew each individual image to match a temperature range of 55 degrees (i.e., the difference between the global high and low). As such, if an image has a temperature range of 27.5 degrees, the contrast converter 312 is configured to "stretch" the color range to match the global temperature range of 55 degrees.

In yet another embodiment, the contrast converter 312 is configured to analyze the cumulative probability distribution function of each image. The contrast converter 312, in this embodiment, is configured to normalize each image based on the cumulative probability distribution function and match the histograms of each image to form a consistent, or globally contrasted, composite image. Starting from a reference image with a function F1, which may be selected by a user, and one of the images with a distribution function F2, the contrast converter 312 identifies a first gray level value G1 (e.g., between 0 and 255) for the distribution function F1, and a second gray level value G2 for the distribution function F2, such that F1(G1)=F2(G2). The contrast converter 312, subsequently, is configured to determine a matching function that when applied to each pixel in each of the images results in a globally contrasted composite image.

In each of the above embodiments, where temperature is discussed, it is to be understood that any data value representing different temperature values may be substituted for the temperature values. For example, pixel counts from a histogram may be used in place of temperature values.

The image generator 110 includes an orthorectifier 314 and a georeference 316 for the final generation of the composite image. As described above, the orthorectifier 314 and georeferencer 316 are configured to map images to a three-dimensional model of the terrain. The three-dimensional model of the terrain may be generated by a laser rangefinder in communication with the image generator 110 such that the image generator 110 may store laser rangefinder information with the metadata 308. The individual images 306, after having been contrast corrected, may be mapped to the three-dimensional model, as described above.

Figure 4:
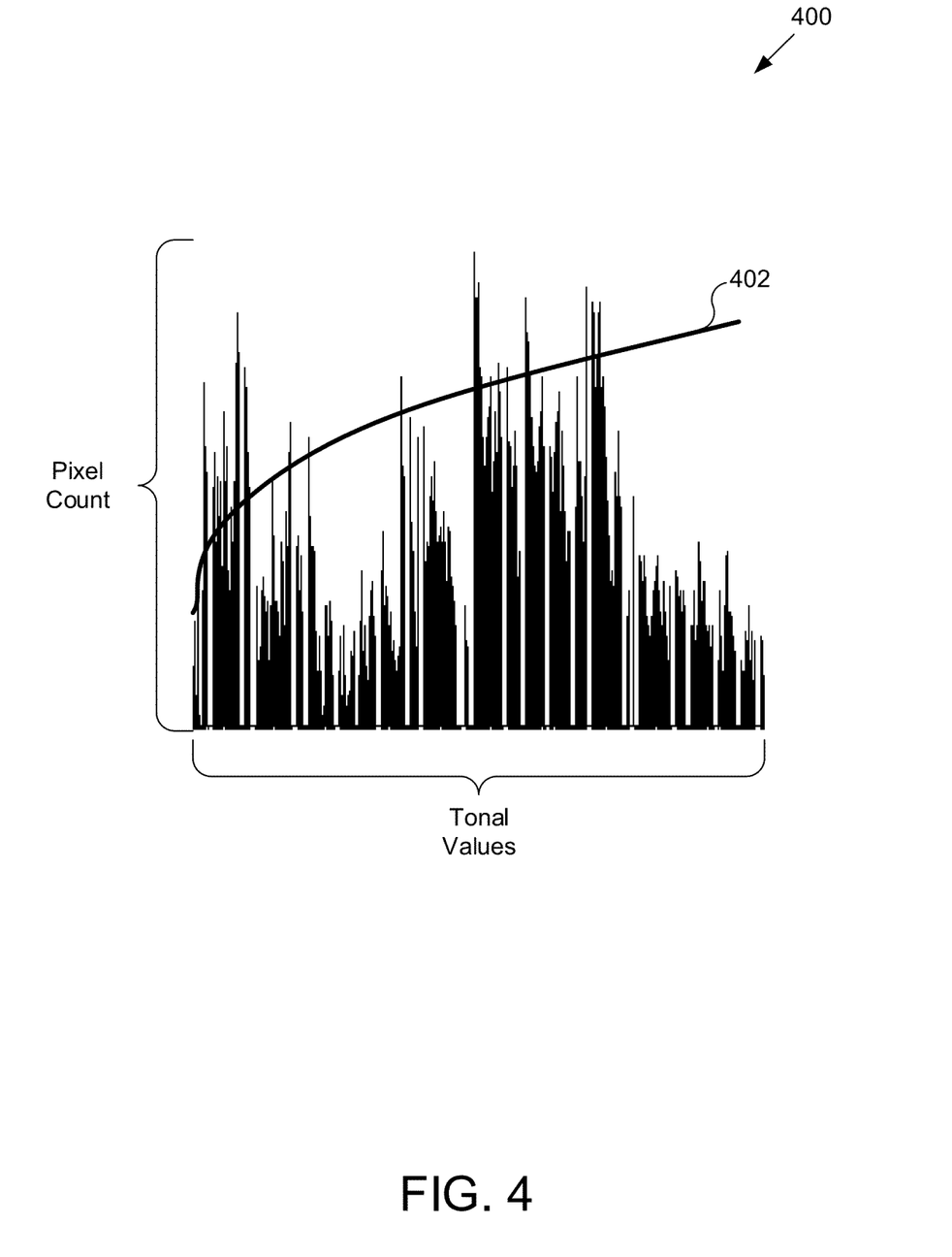
FIG. 4 is a schematic diagram illustrating one embodiment of a histogram.

FIG. 4 is a schematic diagram illustrating one embodiment of a histogram 400. The histogram 400, generally, is a diagram of pixel counts on the y-axis as compared to distinct tonal values on the x-axis. The distinct tonal values may be, in one embodiment, discrete color values. The color values, as described above, may correspond to the grayscale color space. Accordingly, the tonal values across the x-axis may be representative of the 256 grayscale shades.

The histogram 400 allows the contrast converter 312 to generate a probability distribution 402 for each image. The probability distribution 402 represents the distribution of colors across the range of discrete colors. As described above, the contrast converter 312 may be configured to determine a matching function, and subsequently apply the matching function to each individual image to generate a uniformly contrasted composite image. In another embodiment, the contrast converter 312 is configured to identify a statistical high (e.g., 75%) and low range (e.g., 25%) for each image by analyzing the peaks of the histogram 400, to determine where the bulk of the "brightness" or "color" of the image lies, in a manner similar to a bell-curve analysis. For example, the high and low pixel count may be 7500 and 4500 pixels. The contrast converter 312 is configured to determine a global high pixel count 7500 (which corresponds to an upper temperature), and a global low pixel count (which corresponds to a lower temperature). The contrast converter 312 then converts the upper temperature and the lower temperature to a range which is scaled to the number of discrete temperatures as described above.

Figure 5:
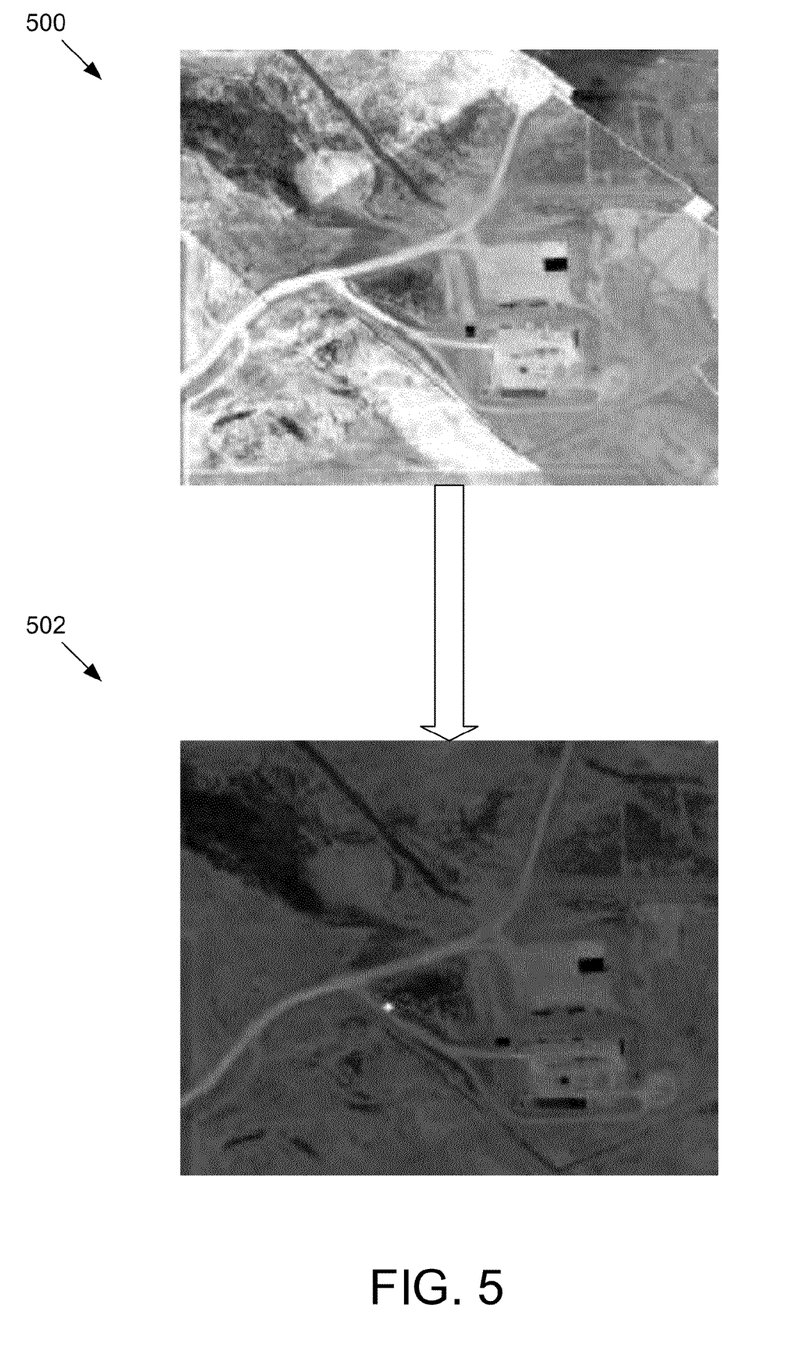
FIG. 5 is an aerial view of a terrain illustrating a composite image having non-uniformly contrasted individual images (before processing) compared to a composite image that is uniformly contrasted.

FIG. 5 is an aerial view of a terrain illustrating a composite image 500 having non-uniformly contrasted individual images (before processing) compared to a composite image 502 that is uniformly contrasted. The regions of the FIG. 500 demonstrate how sections may be contrasted brighter than an adjacent region. "Hot spots," depicted as the almost white regions, tend to dominate and affect an entire individual image. The map 502, however, has been contrasted according to one of the embodiments described above. The contrast of each individual image has been scaled to match a global contrast scale determined by one of the methods described previously. A verifiable "hot spot" is now visible and not obscured by the skewed contrast levels of the map 500.

Figure 6:
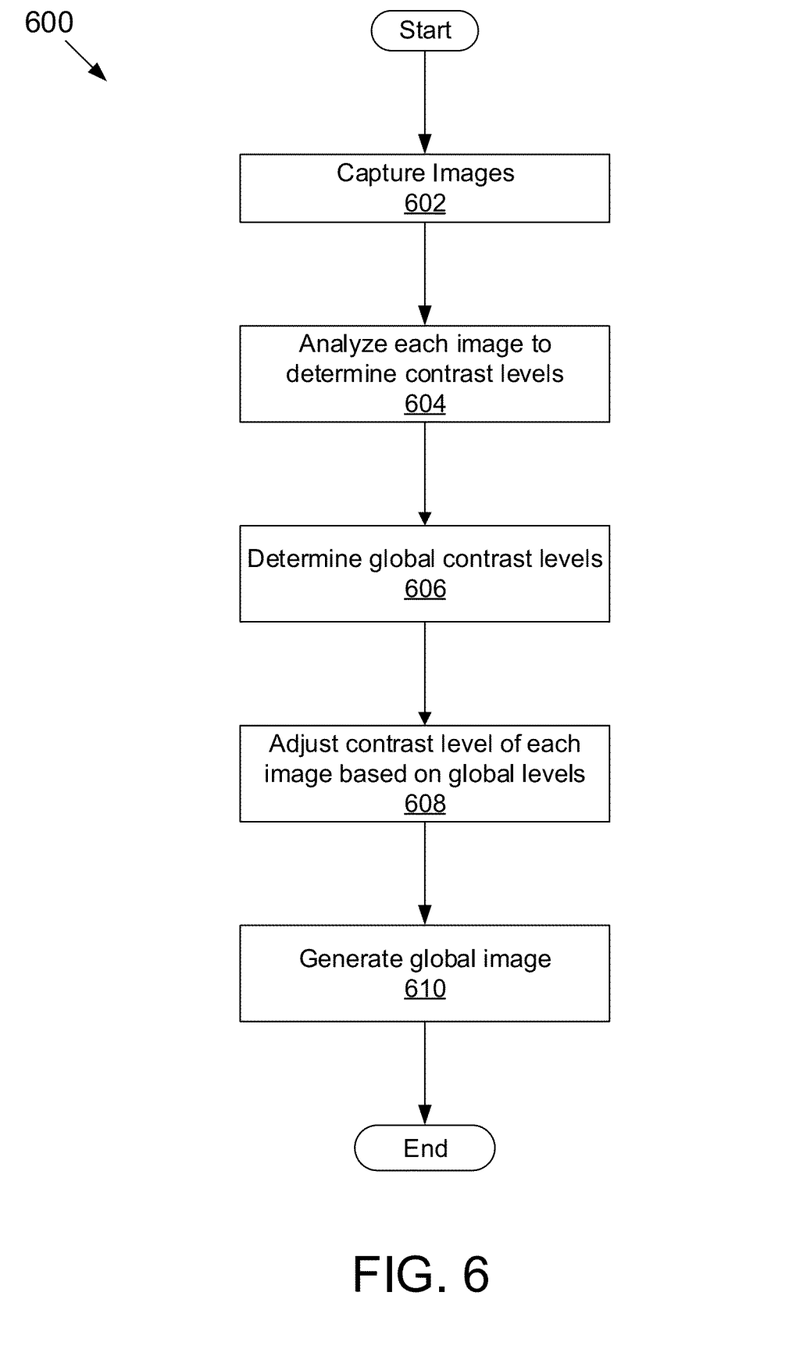
FIG. 6 is a flow diagram of one embodiment of a method of global contrast adjustment of individual images to form uniformly contrasted composite image in accordance with one embodiment of the present disclosure.

FIG. 6 is a flow diagram of one embodiment of a method 600 of global contrast adjustment of individual images to form uniformly contrasted composite image in accordance with one embodiment of the present disclosure. The method 600 is performed by processing logic that may comprise hardware (circuitry, dedicated logic, etc.), software (such as is run on a general-purpose computing system or a dedicated machine), or a combination of both. In one embodiment, the image generator 110 performs the method 600.

Referring to FIG. 6, the processing logic begins the method 600 by capturing images, at block 602. In one embodiment, the processing logic captures images by directing an image capture device to capture a series of images taken with a frequency determined by environmental variables. The environmental variables may include, but are not limited to, the change of elevation of the terrain, the speed of the vehicle, or the ambient brightness of the sun (e.g., % cloud cover, etc.). In another embodiment, the processing logic receives a series of already captured photos.

At block 604, the processing logic analyzes each image to determine contrast levels. In one embodiment, the processing logic analyzes each image by generating a histogram for each image. That is to say, the processing logic determines how many pixels in each picture correspond to a discrete color or tonal value, and then the processing logic maintains metadata for each image that contains the histogram.

At block 606, the processing logic determines global contrast levels. In one embodiment, the processing logic determines global contrast levels by either averaging a high and low temperature for each image, or identifying a global high and low level for each image. The level may refer to a pixel count or a temperature as described above.

At block 608, the processing logic adjusts the level of each image based on global contrast levels. The global contrast levels may refer to temperature ranges or pixel ranges. At block 610, the processing logic generates the global or composite image by orthorectifying and georeferencing the series of images to a three-dimensional map. The method 600 then ends.

Figure 7:
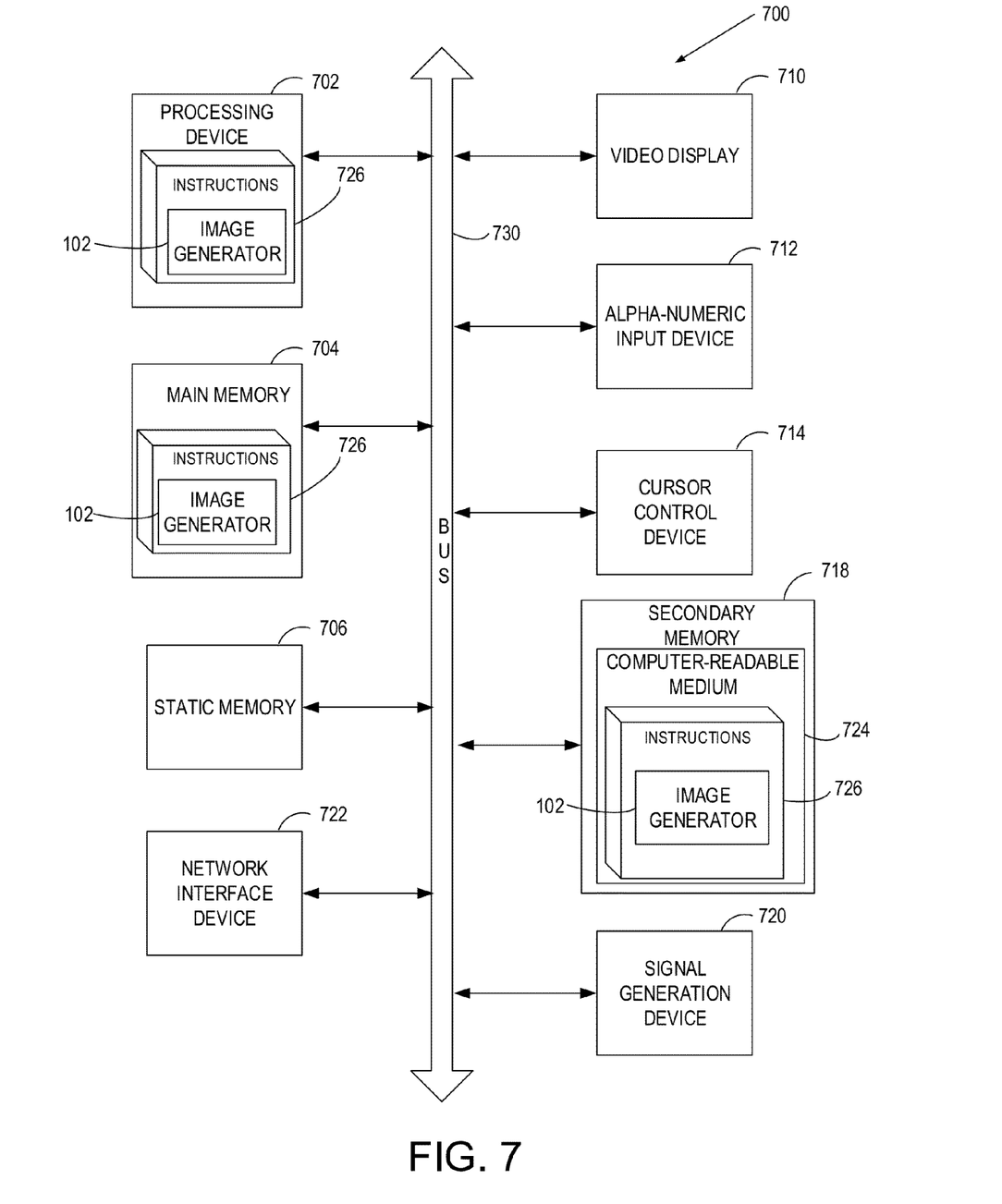
FIG. 7 illustrates a diagrammatic representation of a machine in the exemplary form of a computing system within which a set of instructions, for causing the machine to perform any one or more of the methodologies discussed herein, may be executed.

FIG. 7 illustrates a diagrammatic representation of a machine in the exemplary form of a computing system 700 within which a set of instructions, for causing the machine to perform any one or more of the methodologies discussed herein, may be executed. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random access memory (DRAM)

such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for the image generator 110 as described herein. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "generating," "providing," "selecting," "obtaining," "receiving," "determining," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method for generating a composite thermal image, comprising:
receiving image data corresponding to a plurality of thermal images, wherein each of the thermal images corresponds to a subset portion of a geographical region, such that joining the plurality of thermal images forms a composite thermal image of the geographical region;
analyzing the plurality of images to determine thermal range data for each of the plurality of images;
analyzing the thermal range data for each of the plurality of thermal images to determine a global thermal range with a global minimum thermal value corresponding to a minimum thermal value of the plurality of thermal images and a global maximum thermal value corresponding to a maximum thermal value of the plurality of thermal images;
adjusting a thermal level of each of the plurality of thermal images based on the global thermal range, such that a minimum value of the thermal range data for each of the plurality of thermal images is mapped relative to the global minimum thermal value, and a maximum value of the thermal range data for each of the plurality of thermal images is mapped relative to the global maximum thermal value; and
generating a composite thermal image of the geographical region based on the plurality of mapped images that retains distinguishable temperature variations for each of the thermal images used for the composite image.

2. The method of claim 1, wherein a minimum value of the thermal range data for at least one of the plurality of thermal images is mapped to be equal to the global minimum thermal value.

3. The method of claim 1, wherein a maximum value of the thermal range data for at least one of the plurality of thermal images is mapped to be equal to the global maximum thermal.

4. The method of claim 1, wherein adjusting the thermal level of each of the plurality of thermal images comprises scaling an individual thermal range of each thermal image to match the global thermal range.

5. The method of claim 1, wherein determining the global thermal range comprises excluding one or more extreme thermal values.

6. The method of claim 5, further comprising receiving a user indicated thermal range outside of which thermal values should be excluded.

7. The method of claim 5, wherein determining the global thermal range comprises automatically determining thermal values that should be excluded.

8. The method of claim 1, wherein the plurality of thermal images each include an initial contrast level determined from an individual thermal range.

9. A system comprising:
a processor;
a thermal imaging device configured to capture image data corresponding to a plurality of thermal images, wherein each of the thermal images corresponds to a subset portion of a geographical region, such that joining the plurality of thermal images forms a composite thermal image of the geographical region; and
a non-transitory memory in communication with the processor, the memory comprising instructions executable by the processor for:
a level analyzer configured to analyze a plurality of thermal images captured by the thermal imaging device to determine a global thermal contrast range with a global minimum thermal value corresponding to a minimum thermal value of the plurality of thermal images and a global maximum thermal value corresponding to a maximum thermal value of the plurality of thermal images;
a contrast converter configured to adjust a thermal contrast level of each of the plurality of thermal images based on the global thermal contrast range, such that a minimum value of the thermal range data for each of the plurality of thermal images is mapped relative to the global minimum thermal value, and a maximum value of the thermal range data for each of the plurality of thermal images is mapped relative to the global maximum thermal value; and an image generator configured to generate a composite thermal image of the geographical region based on the plurality of mapped images that retains distinguishable temperature variations for each of the thermal images used for the composite image.

10. The system of claim 9, wherein the level analyzer is configured to map a minimum value of the thermal range data for at least one of the plurality of thermal images to be equal to the global minimum thermal value.

11. The system of claim 9, wherein the level analyzer is configured to a maximum value of the thermal range data for at least one of the plurality of thermal images is mapped to be equal to the global maximum thermal value.

12. The system of claim 9, wherein the contrast converter is configured to scale an individual thermal range of each thermal image to match the global thermal contrast range.

13. The system of claim 9, wherein the level analyzer is configured to exclude one or more extreme thermal values.

14. The system of claim 13, the level analyzer is configured to receive a user indicated thermal range outside of which thermal values should be excluded.

15. The system of claim 13, wherein the level analyzer is configured to automatically determine thermal values that should be excluded.

16. The system of claim 9, wherein the plurality of thermal images each include an initial contrast level determined from an individual thermal range.

17. A non-transitory computer readable storage medium comprising program code that, when executed by a process, is configured to cause the processor to perform operations comprising:
  receiving image data corresponding to a plurality of thermal images, wherein each of the thermal images corresponds to a subset portion of a geographical region, such that joining the plurality of thermal images forms a composite thermal image of the geographical region;
  analyzing the plurality of images to determine thermal range data for each of the plurality of images;
  analyzing the thermal range data for each of the plurality of thermal images to determine a global thermal range with a global minimum thermal value corresponding to a minimum thermal value of the plurality of thermal images and a global maximum thermal value corresponding to a maximum thermal value of the plurality of thermal images;
  adjusting a thermal level of each of the plurality of thermal images based on the global thermal range, such that a minimum value of the thermal range data for each of the plurality of thermal images is mapped relative to the global minimum thermal value, and a maximum value of the thermal range data for each of the plurality of thermal images is mapped relative to the global maximum thermal value; and
  generating a composite thermal image of the geographical region based on the plurality of mapped images that retains distinguishable temperature variations for each of the thermal images used for the composite image.

18. The non-transitory computer readable storage medium of claim 17, wherein a minimum value of the thermal range data for at least one of the plurality of thermal images is mapped to be equal to the global minimum thermal value.

19. The non-transitory computer readable storage medium of claim 17, wherein a maximum value of the thermal range data for at least one of the plurality of thermal images is mapped to be equal to the global maximum thermal value.

20. The non-transitory computer readable storage medium of claim 17, wherein adjusting the thermal level of each of the plurality of thermal images comprises scaling an individual thermal range of each thermal image to match the global thermal range.

21. The system of claim 9, wherein the thermal imaging device comprises one of a non-radiometric imaging device and a radiometric imagining device.

* * * * *